United States Patent
Weng

(10) Patent No.: US 6,722,240 B1
(45) Date of Patent: Apr. 20, 2004

(54) DEVICE FOR DESTROYING SIGNALS ON COMPACT DISK

(75) Inventor: Jin-Sheng Weng, Taipei (TW)

(73) Assignee: Taiwan Bor Ying Corporation, Taipei Hsien (TW)

( * ) Notice: Subject to any disclaimer, the term of this patent is extended or adjusted under 35 U.S.C. 154(b) by 0 days.

(21) Appl. No.: 10/460,692

(22) Filed: Jun. 11, 2003

(51) Int. Cl.⁷ .............................. B26F 1/02; G11B 3/58
(52) U.S. Cl. .............................. 83/167; 83/588; 83/694; 369/72; 369/272
(58) Field of Search .......................... 83/588, 618, 633, 83/698, 167, 467 R, 571, 625, 627, 13, 686, 689, 542, 870, 395, 451, 948; 369/72, 272, 285, 286, 287; 241/36, 241, 185.5, 260.1; 51/328, 413, 418; 264/106, 162, 293, 138–139

(56) References Cited

U.S. PATENT DOCUMENTS

| | | | | |
|---|---|---|---|---|
| 4,036,088 A | * | 7/1977 | Ruskin | 83/167 |
| 4,656,907 A | * | 4/1987 | Hymmen | 83/571 |
| 4,757,733 A | * | 7/1988 | Barlow | 83/588 |
| 4,965,118 A | * | 10/1990 | Kodera et al. | 428/137 |
| 5,220,754 A | * | 6/1993 | Tayebi et al. | 451/59 |
| 5,520,865 A | * | 5/1996 | Sargent et al. | 264/106 |
| 5,619,898 A | * | 4/1997 | Witt | 83/870 |
| 6,322,430 B1 | * | 11/2001 | Kennedy et al. | 451/287 |
| 6,585,177 B2 | * | 7/2003 | Castronovo | 241/36 |
| 6,634,267 B1 | * | 10/2003 | Edens et al. | 83/13 |
| 2002/0044513 A1 | * | 4/2002 | Weng | 369/72 |

* cited by examiner

Primary Examiner—Allan N Shoap
Assistant Examiner—Ghassem Alie
(74) Attorney, Agent, or Firm—Pro-Techtor International Services

(57) ABSTRACT

A device for destroying signals stored on compact disk includes a base, a punching pin, and a push lever. The base has a top stub for engaging with a central hole of a compact disk positioned on the base, a through hole corresponding to a Start Lead In (SLD) area on the compact disk, and an L-shaped arm portion holding a spring mechanism. The punching pin is vertically movably mounted in the spring mechanism and aligned with the SLD area, and the push lever is pivotally connected at an end to one side of the arm portion for pushing against an upper end of the punching pin. When the push lever is pivotally pushed downward, the punching pin is driven downward to punch a hole on the SLD area and ruin lead-in signals recorded thereon, preventing data stored on the compact disk from being read and disclosed.

6 Claims, 1 Drawing Sheet

DEVICE FOR DESTROYING SIGNALS ON COMPACT DISK

FIELD OF THE INVENTION

The present invention relates to a device for destroying signals stored on a compact disk, and more particularly to a punching device adapted to punch holes on a compact disk, so that signals stored on the compact disk are ruined and protected from being read and undesirably disclosed.

BACKGROUND OF THE INVENTION

In producing general compact disk (CD), video compact disk (VCD), digital video disk (DVD) and the like, signal data to be stored thereon are converted into a series of differently sized pits and lands on the disk through specific techniques. The signal data stored on the disk in this manner are then read using a laser beam.

When a disk becomes useless and is discarded, it forms a possible gate via which important signal data stored on the disk is undesirably disclosed. To avoid such undesirable disclosure of important signal data, it is preferable to destroy such signal data before the compact disk storing them is discarded.

A compact disk in use usually has a large quantity of data stored in different areas on the compact disk. An area among the data storing areas on each compact disk is particularly assigned to record lead-in signals for all other data stored on the compact disk. This area is usually referred to as the Start Lead In (SLD) and located within an annular area having an overall diameter about 46 mm. That is, a radial distance between the SLD area and a center of the compact disk is about 23 mm. When the lead-in signals in this area are destroyed it would be impossible to read all other data stored on the compact disk.

Up to date, there is not any structure or device particularly designed for destroying signals recorded on the SLD area of a compact disk to be discarded and thereby protecting all other data stored on the compact disk against undesirable reading and disclosure.

SUMMARY OF THE INVENTION

A primary object of the present invention is to provide a device for destroying signals stored on compact disk, so that data stored on a compact disk to be discarded could not be read and are therefore protected against undesirable disclosure.

To achieve the above and other objects, the device of the present invention for destroying signals stored on compact disk mainly includes a base, a punching pin, and a push lever. The base is provided on a top at predetermined positions with a stub for engaging with a central hole of a compact disk positioned on the base, a through hole corresponding to the Start Lead In (SLD) area on the compact disk, and an L-shaped arm portion provided at one side of the base to extend upward and then toward a central portion of the base for holding a spring mechanism thereto. The spring mechanism includes, for example, a spring chamber provided at an inner end of the arm portion, and a spring positioned in the spring chamber. The spring chamber is provided at a bottom with a through hole to communicate with a lower side of the arm portion. The punching pin is vertically movably mounted in the spring in the spring chamber. The punching pin has a lower end adapted to pass through the hole on the bottom of the spring chamber to align with and reach at the SLD area on the compact disk, and an upper end provided with a flange for pressing against an upper end of the spring. The push lever is pivotally connected at an end to one side of the L-shaped arm portion via a pivot pin, and provided at a lower side with a protruded push contact for pushing against the upper end of the punching pin. When the push lever is pushed downward to pivotally turn about the pivot pin, the punching pin is driven downward by the push contact to punch a hole on the SLD area and ruin lead-in signals recorded thereon, preventing other signal data stored on the compact disk from being read and disclosed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
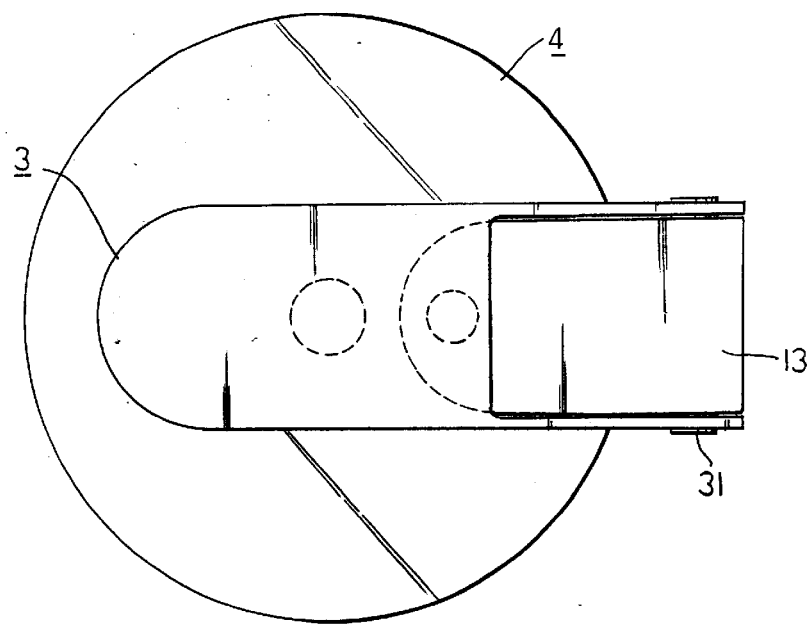
FIG. 1 is a top plan view of a device for destroying signals stored on compact disk according to an embodiment of the present invention.
Figure 2:
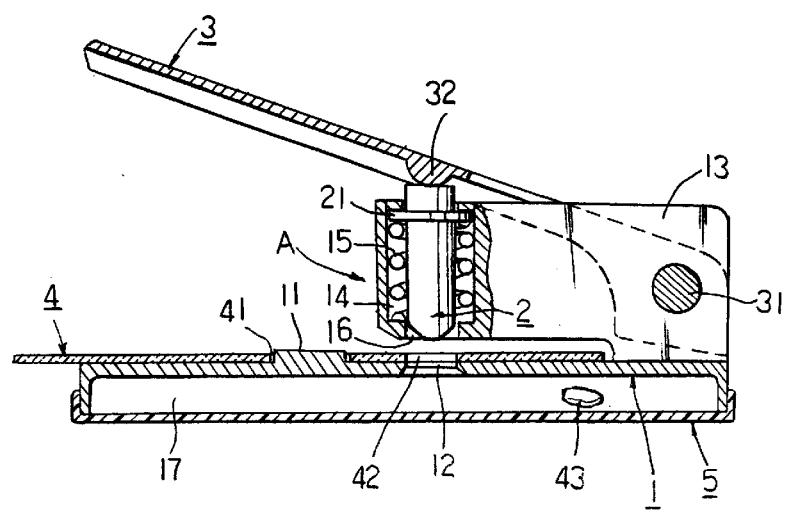
FIG. 2 is a sectioned side view of the device of FIG. 1.

Please refer to FIGS. 1 and 2 that are top plan view and sectioned side view, respectively, of a device for destroying signals stored on compact disk according to an embodiment of the present invention. As shown, the device mainly includes a base 1, a punching pin 2, and a push lever 3.

The base 1 is provided on a top at a predetermined position with a stub 11, so that a compact disc 4 to be discarded may be positioned on the base 1 with a central hole 41 engaged with the stub 11. The base 1 is also provided on the top with a through hole 12 to correspond to a Start Lead In (SLD) area on the compact disk 4 positioned on the base 1. An L-shaped arm portion 13 is provided at one side of the base 1 to extend upward and then toward a central portion of the base 1. The L-shaped arm portion 13 is internally provided with a spring mechanism A for providing an upward spring force to the punching pin 2 and the push lever 3. The spring mechanism A may include, for example, a spring chamber 14 provided in the L-shaped arm portion 13 and a spring 15 positioned in the spring chamber 14. The spring chamber 14 is provided at a bottom with a through hole 16 to communicate with a lower side of the L-shaped arm portion 13.

The punching pin 2 is located in the spring chamber 14 of the spring mechanism A with the spring 15 mounted therearound. A lower end of the punching pin 2 is adapted to pass through the hole 16, and an upper end of the punching pin 2 is provided with a flange 21 for pressing against an upper end of the spring 15. When the punching pin 2 is pushed downward, the flange 21 is also downward moved to compress the spring 15. When the punching pin 2 is no longer downward pushed, the compressed spring 15 is released to produce a restoring force that moves the punching pin 2 upward again. As can be seen from FIG. 2, the vertically movable punching in 2 is aligned with the SLD area on the compact disk The push lever 3 is pivotally connected at an end via a pivot pin 31 to an outer end of the L-shaped arm portion 13 opposite to the spring chamber 14. A downward protruded push contact 32 is provided at a lower side of the push lever corresponding to the upper end of the punching pin 2. The protruded push contact 32 preferably has a curved configuration that allows the push contact 32 to contact at different points with the upper end of the punching pin 2 while the push lever 3 is gradually pushed, so that the punching pin 2 is always vertically movable up and down in the spring chamber 14.

When the push lever 3 is downward pushed to pivotally turn about the pivot pin 31, the push contact 32 at the lower side of the push lever 3 is brought to contact with and drive the punching pin 2 downward to punch a hole 42 on the SLD area on the compact disk 4. The hole 42 ruins lead-in signals recorded on the SLD area and prevents other data stored on the compact disk 4 from being read and accordingly protects these data against undesirable disclosure when the compact disk 4 is discarded. It is known the compact disk 4 is usually made of a PC plastic material through injection molding and has a thickness about 1.2 mm. The punching pin 2 of the destroying device of the present invention is structurally strong enough to easily penetrate the compact disk 4 and form the punched hole 42 within the SLD area of the compact disk 4.

The base 1 has an open bottom to define a hollow space 17. A bottom cover 5 is removably connected to the open bottom of the base 1 to openably close the space 17 for collecting chips 43 punched off the compact disk 4 therein.

In brief, the present invention provides a device for destroying signals stored on a compact disk. The device includes a punching pin that is aligned with and adapted to easily penetrate the SLD area on the compact disk and ruin lead-in signals recorded thereon, so that all other data stored on the compact disk are prevented from reading and accordingly undesirable disclosure when the compact disk is discarded.

What is claimed is:

1. A device for destroying signals stored on compact disk, said compact disk including a plurality of data storing areas for storing signal data therein and a Start Lead In (SLD) area for recording lead-in signals for said signal data, and any ruin of said lead-in signals on said SLD area resulting in failure of reading said signal data stored on said compact disk, said device comprising:

a base having an open bottom to define a hollow space therein, and being provided on a top at predetermined positions with an upward extended stub for engaging with a central hole of said compact disk positioned on said base, a through hole corresponding to said SLD area on said compact disk, and an L-shaped arm portion located at one side of said base to extend upward and then toward a central portion of said base for holding a spring mechanism to provide an upward spring force;

a punching pin vertically movably mounted in said spring mechanism to align with said SLD area on said compact disk positioned on said base; and a push lever having an end pivotally connected via a pivot pin to one side of said L-shaped arm portion opposite to said spring mechanism, said push lever being provided at a lower side with a downward protruded push contact for contacting with and pushing against an upper end of said punching pin;

whereby when said push lever is pivotally pushed downward, said push contact is in contact with and drives said punching pin downward to compress said spring mechanism and penetrate said SLD area on said compact disk, so that a punched hole is formed on said SLD area to destroyed said lead-in signals recorded on said SLD area and thereby prevent said signal data stored on said compact disk from being read and disclosed.

2. The device for destroying signals stored on compact disk as claimed in claim 1, wherein said spring mechanism includes a spring chamber provided in said L-shaped arm portion and a spring positioned in said spring chamber; said spring chamber being provided at a bottom with a through hole to communicate with a lower side of said L-shaped arm portion, and said punching pin being located in said spring chamber with said spring mounted therearound; and wherein said punching pin has a lower end adapted to pass through said through hole at the bottom of said spring chamber, and an upper end provided with a flange for pressing against a top of said spring.

3. The device for destroying signals stored on compact disk as claimed in claim 1, wherein said protruded push contact has a curved configuration.

4. The device for destroying signals stored on compact disk as claimed in claim 1, wherein said base includes a bottom cover removably connected to the open bottom thereof to openably close said hollow space in said base for collecting chips punched off said SLD area of said compact disk.

5. The device for destroying signals stored on compact disk as claimed in claim 2, wherein said protruded push contact has a curved configuration.

6. The device for destroying signals stored on compact disk as claimed in claim 2, wherein said base includes a bottom cover removably connected to the open bottom thereof to openably close said hollow space in said base for collecting chips punched off said SLD area of said compact disk.

* * * * *